No. 687,632. Patented Nov. 26, 1901.
F. A. JONES & E. G. KASTENHUBER.
OIL MILL.
(Application filed May 4, 1901.)
(No Model.) 2 Sheets—Sheet 1.

WITNESSES:
William M Miller
Chas. E. ...

INVENTORS
Fred A. Jones
Edwin G. Kastenhuber
BY
W. C. Hauff
ATTORNEY

No. 687,632. Patented Nov. 26, 1901.
F. A. JONES & E. G. KASTENHUBER.
OIL MILL.
(Application filed May 4, 1901.)

(No Model.) 2 Sheets—Sheet 2.

WITNESSES:
William Miller
Chas. E. Reager

INVENTORS
Fred A. Jones
Edwin G. Kastenhuber
BY W. C. Hauff
ATTORNEY

UNITED STATES PATENT OFFICE.

FRED A. JONES, OF SCHENECTADY, NEW YORK, AND EDWIN G. KASTENHUBER, OF BLOOMFIELD, NEW JERSEY.

OIL-MILL.

SPECIFICATION forming part of Letters Patent No. 687,632, dated November 26, 1901.

Application filed May 4, 1901. Serial No. 58,773. (No model.)

*To all whom it may concern:*

Be it known that we, FRED A. JONES, residing at Schenectady, in the county of Schenectady and State of New York, and EDWIN G. KASTENHUBER, residing at Bloomfield, in the county of Essex and State of New Jersey, citizens of the United States, have invented new and useful Improvements in Oil-Mills, of which the following is a specification.

This invention relates to a mill adapted for crushing or pressing such substance as cottonseed or similar material and preventing escape of the material until after the operation is completed, so that oil or material will be effectively pressed out.

The invention resides in the novel features of construction set forth in the following specification and claims and illustrated in the annexed drawings, in which—

Figure 1:
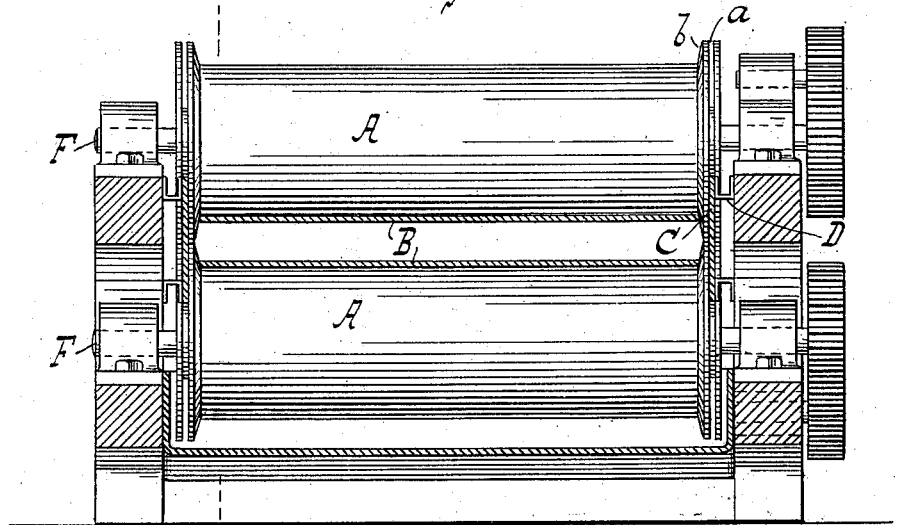
Figure 2:
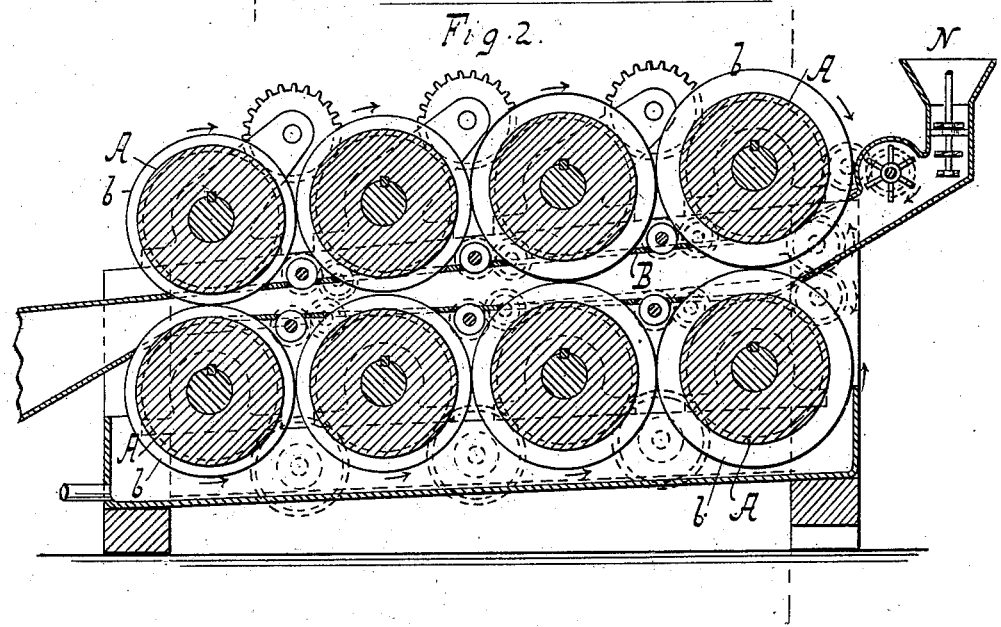
Figure 3:
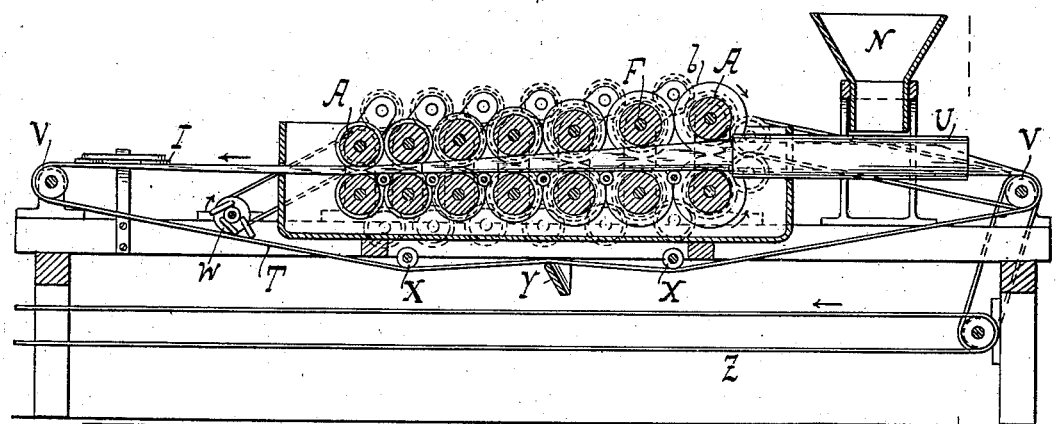
Figure 5:
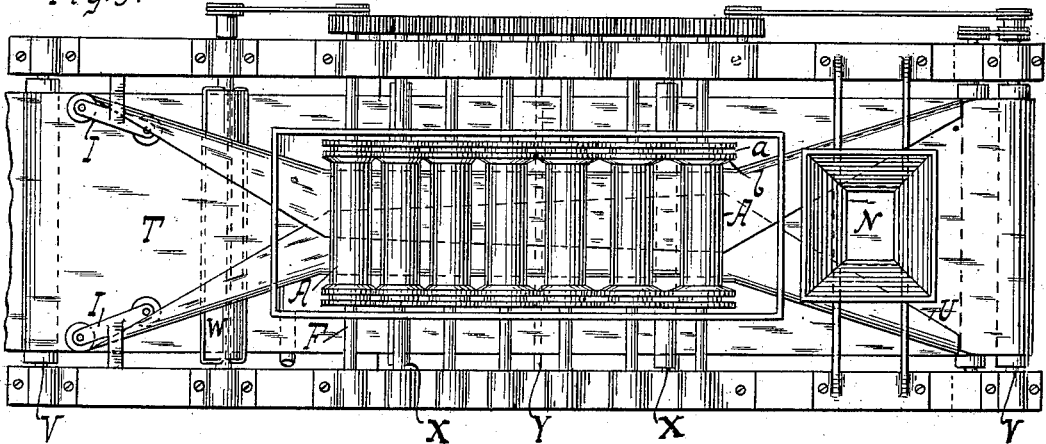
Figure 4:
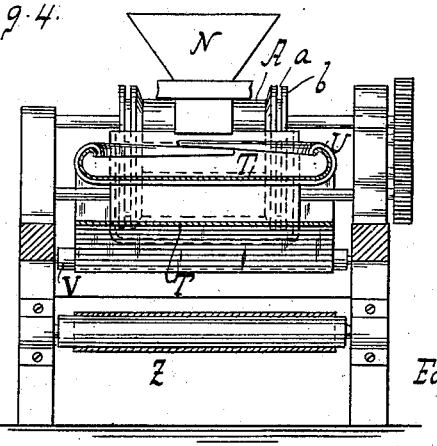

Figure 1 is a sectional end view of the device. Fig. 2 is a longitudinal sectional side elevation. Fig. 3 shows a series of rollers with a belt or carrier. Fig. 4 is a cross-section of Fig. 3. Fig. 5 is a plan view of Fig. 3.

In the drawings are shown rollers A, arranged in pairs, each pair comprising upper and lower rollers. The pairs are shown arranged one in front of the other, or it might properly be called "arranged in tandem." The rollers or their shafts F are suitably journaled in a support or frame E and are shown provided with flanges $b$, said flanges being grooved, as shown at $a$, for a purpose presently explained. Said frame also carries scraper-plates B, made to contact with the bodies of the rollers. Said plates being made to contact at both their front and rear edges with the rollers will prevent material or seeds escaping or falling between succeeding rollers and will also act as scrapers or doctors for the rollers. The end plates C are made to extend into the grooves in the roller-flanges. While the upper and lower scraper-plates prevent the material escaping above or below the rollers, the end plates entering the flange-grooves prevent the material or meal from working out at the sides or laterally out of the spaces between the rollers. The scraper and end plates can be connected or formed together and are shown secured by brackets D, connecting the plates to the frame. The upper scraper-plates might perhaps in some cases be dispensed with and the weight of the material depended on to prevent the same working upward between the upper rollers; but upper and lower confining or scraping plates have been found satisfactory.

By having the successive pairs of rollers set nearer together or arranged at varying distances apart graduated or varied pressure can be secured as the material travels along.

In addition to the plates B C a belt T can be applied to prevent escape of material. This belt is made of suitable flexible material and runs about the rollers V. A folder, which can be made somewhat on the plan of a plaiting attachment, is shown at U and causes the belt to be lapped or doubled on its way through between the rollers. After leaving the rollers a spreader I can restore the belt to flat or normal condition.

The material being fed through hopper N or suitably delivered on belt T is confined in the latter when doubled, and on its way through the rollers such material is suitably crushed or pressed. After leaving the rollers the material falls off at the lower or return portion of the belt, to be suitably disposed of. A carrier Z could convey such substance to a grinder or other locality or repository.

The roller or shaft W, with loose or swinging arms or beaters striking the belt, causes adhering material to drop off, and a scraper Y can also serve for keeping the belt clear. Guide-rollers X can be suitably arranged for insuring suitable contact between the belt and the scraper Y.

In speaking of an "oil-mill" it is understood that the device is serviceable as such; but of course it is manifest that the same can be used for expressing juice or liquid matter of various kinds and is not necessarily confined to oil.

The flanges $b$, as noted, serve to prevent lateral escape of material and contact with one another. These flanges, as shown, gradually diminish in diameter, so that while the flanges of each pair are in contact the bodies of the rollers are separated by varied or gradually-diminishing spaces.

The rollers J are suitably geared to or driven by suitable connection with a part or the shafts of the machine and aid in moving along the bulk or mass of meal or material from one set or pair of presser-rollers A to the next.

What we claim as new, and desire to secure by Letters Patent, is—

1. The combination of rollers arranged in pairs, having flanges at the ends thereof, the flanges of each pair of the rolls being in contact and the flanges being circumferentially grooved, plates extending into said grooves, and scrapers for the bodies of said rolls.

2. The combination of rollers arranged in pairs, having flanges at the ends thereof, the flanges of each pair of the rolls being in contact and the flanges being circumferentially grooved, plates extending into said grooves, scrapers for the bodies of said rolls, a belt arranged to pass between the pairs of rolls, and a folder for a portion of said belt.

In testimony whereof we have hereunto set our hands in the presence of two subscribing witnesses.

FRED A. JONES.
EDWIN G. KASTENHUBER.

Witnesses:
A. J. DILLINGHAM,
DANIEL P. HALTON.